United States Patent [19]

Farrow

[11] Patent Number: 4,804,819
[45] Date of Patent: Feb. 14, 1989

[54] STRUCTURE AND METHOD FOR RESISTANCE WELDING WITH AN INDUCTIVELY COUPLED POWER SOURCE

[75] Inventor: John F. Farrow, Plymouth, Mich.
[73] Assignee: Medar, Inc., Farmington Hills, Mich.
[21] Appl. No.: 938,977
[22] Filed: Dec. 8, 1986
[51] Int. Cl.$^4$ .............................................. B23K 11/00
[52] U.S. Cl. .................................... 219/91.2; 219/9.5; 219/10.41; 219/10.53
[58] Field of Search ................ 219/7.5, 9.5, 119, 91.2, 219/10.41, 10.53

[56] References Cited

U.S. PATENT DOCUMENTS

| | | | |
|---|---|---|---|
| 3,175,383 | 3/1965 | Levine | 219/7.5 |
| 3,467,806 | 9/1969 | Dixon | 219/9.5 |
| 3,612,803 | 10/1971 | Klass | 219/10.53 |
| 3,883,712 | 5/1975 | McBriarty | 219/9.5 |
| 4,197,441 | 4/1980 | Rudd | 219/9.5 |
| 4,521,659 | 6/1985 | Buckley et al. | 219/10.53 |

FOREIGN PATENT DOCUMENTS 60-255282 12/1985 Japan .................................. 219/91.2

*Primary Examiner*—Clifford C. Shaw
*Attorney, Agent, or Firm*—Dale R. Small

[57] ABSTRACT

Structure for and a method of resistance welding using an induction coupled power source. The structure of the invention comprises an electric coil wrapped around a flux concentrating core in close proximity to members to be welded together, a source of alternating electrical energy connected through the coil and means for applying pressure between the members to be welded. In accordance with the method of the invention the members to be welded are heated by at least one of an induced current and hysteresis loss and the heated members are then forged together by applying pressure thereon. The weld effected by the method of the invention may be either a spot weld or a continuous weld. Further in accordance with the structure of the invention the flux concentrating core may be on one or both sides of the materials to be welded and may be linear and perpendicular or at an angle to the members to be welded, or may be U-shaped or cup-shaped including a central post around which the coil is wrapped.

18 Claims, 2 Drawing Sheets

STRUCTURE AND METHOD FOR RESISTANCE WELDING WITH AN INDUCTIVELY COUPLED POWER SOURCE

BACKGROUND OF THE INVENTION

1. Field of the Invention

The invention relates to welding and refers more specifically to a structure for and method of resistance welding using an inductively coupled power source to heat the material to be welded by current and/or magnetic hysteresis induced therein.

2. Description of the Prior Art

The resistance welding process is commonly used to make spot or seam welds to join sheet metal parts. In the resistance welding process of the past, electrodes usually made of copper have been used to apply large amounts of current to a weld coupling in order to heat the metal to the point where it softens and may be forged together by pressure. The pressure for forging the parts together has been applied through the same welding electrodes which have applied the current to the material to be welded in the past.

Seam welding in the past has been performed in a manner similar to spot welding. In seam welding however, the electrodes have usually been in the shape of wheels which are rolled along the parts to be welded as the weld is being made. Prior art spot welding and seam or continuous welding structures are illustrated in FIGS. 1 and 2 respectively.

The power source for the current used to heat the metal in the past has generally been a low voltage output transformer or direct current power source. The transformers used for resistance welding usually put out voltages of between two and twenty volts at currents of between five thousand and fifty thousand amps.

As a result of the currents involved resistance welding transformers of the past have usually been large and heavy and relatively costly due to the amount of iron and copper required to construct them. A resistance welding transformer of the past has usually weighed several hundred pounds, although smaller transformers weighing only fifty pounds have been made to work in some specialized applications. Most resistance welding transformers require water cooling.

Another problem related to resistance welding is getting the current from the transformer (or DC power supply) to the welding electrodes. Because of the size and weight of the normal transformer of the past, it has often been impossible to place the transformer close to the welding electrodes. Large cables have been required to handle the welding currents and keep energy losses to a minimum. Often these cables are water cooled. The cables add cost and complexity to a welding system and are usually the least reliable part of the system.

SUMMARY OF THE INVENTION

In accordance with the structure and method of the invention the largest most costly and least reliable parts of the prior resistance welding system, that is, the transformer and cabling have been replaced by a different structure and method for applying the current to the metal.

The structure of the invention includes a coil wrapped around a flux concentrating core and connected to a source of alternating electrical energy. The coil, core and source of electrical energy may be on both sides of material to be joined by welding or only on one side thereof. The flux concentrating core in accordance with the structure of the invention may be linear and extend perpendicular to the members to be joined or the core may be at an angle to the members to be joined. Further, in different embodiments of the invention the flux concentrating core may be U-shaped and cup-shaped with a post extending centrally therefrom.

In accordance with the method of the invention the metal to be joined is heated adjacent to the flux concentrating core by current induced therein by the current flowing through the coil and by magnetic hysteresis loss. The heated members to be joined are then forged together by applying pressure thereto.

The pressure may be applied to the members to be joined through the coil, through the magnetic core, and/or through separate rotating wheels as desired. Further, the welds so formed may be spot welds or may be continuous seam welds.

DESCRIPTION OF THE PREFERRED EMBODIMENT OF THE INVENTION

Figure 1:
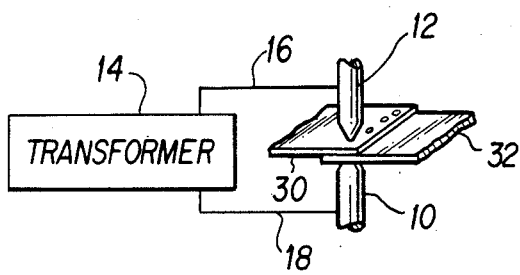
FIG. 1, is a perspective view of prior art resistance spot welding structure.
Figure 2:
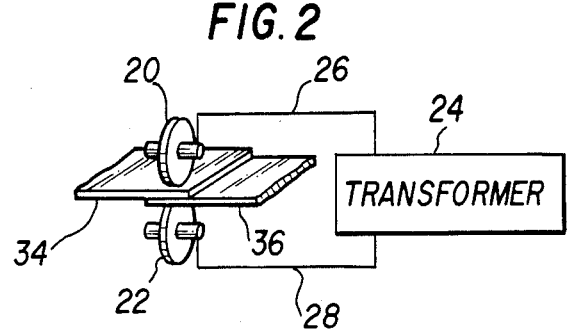
FIG. 2, is a perspective drawing of prior art continuous or seam resistance welding structure.

In accordance with the structure of the invention, the prior art, including the electrodes ten and twelve connected to the transformer 14 by the cables 16 and 18 as shown in FIG. 1, for effective spot welding in accordance with the prior method and the wheel electrodes 20 and 22, shown in FIG. 2, similarly connected to the heavy transformer 24 by the cables 26 and 28, have been replaced for both spot and continuous or seam welding of the ferromagnetic, plates 30 and 32, and plates 34 and 36 respectively, by the resistance welding structure in FIGS. 3 through 6 utilizing an effectively coupled alternating transformer source to effect either spot or continuous seam resistance welding in accordance with the invention.

Figure 3:
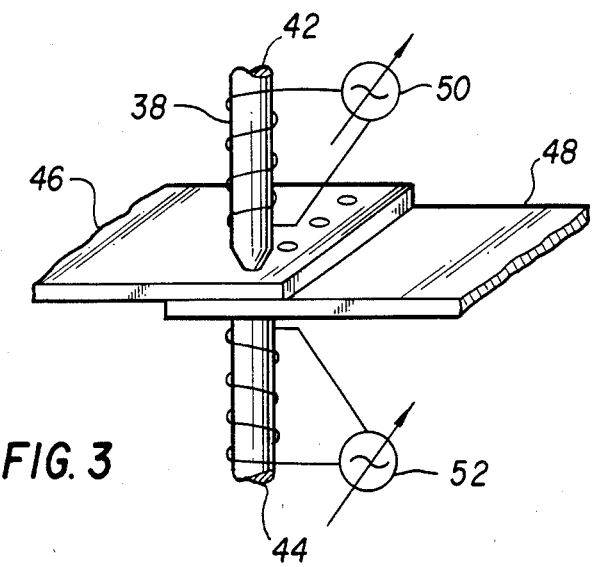
FIG. 3, is a perspective view of structure for resistance welding using an inductively coupled power source constructed in accordance with the invention for effecting the method of the invention.

As shown in FIG. 3, separate coils 38 and 40 are wrapped around linear flux concentrating cores 42 and 44. The flux concentrating cores 42 and 44 are shown in FIG. 3. They extend on opposite sides of the ferromagnetic sheets 46 and 48 to be spot welded.

The coils 38 and 40 are connected to sources of alternating electrical energy 50 and 52 as shown in Fig. 3. Both coils 38 and 40 may ae alternatively connected to the same source of slternating electrical energy in accordance with the invention.

The optimum voltage level and frequency for the alternating current power sources 50 and 52 will vary with different material types and thickness and the optimum voltage and frequency may change as the metal being welded heats up and changes characteristics. However in order to keep the size of the flux concentrating cores 42 and 44 small, as high a frequency as possible should be used. For example, a frequency of ten thousand hertz would be desirable with ferromagnetic cores which are linear and approximately ⅜ of an inch in diameter to spot weld steel sheets approximately ⅛ of an inch thick.

In accordance with the method of the invention by passing the alternating current through coils 38 and 40 in phase so that the magnetic fields generated by the two coils reinforce each other the alternating magnetic field passing perpendicularly through the plane of the metal sheets 46 and 48 will induce a current in the metal in a circular direction around the most intense part of the magnetic field. The effect is somewhat analogous to a transformer, except that instead of a coil inducing a current in another coil, current is induced in the pieces of metal be welded.

The current induced in the metal is used to heat it to the point where it can be forged together under pressure.

The pressure can be applied through the coils or through the flux concentrating core which can be designed to withstand the forging pressure.

When welding ferrous metal such as iron or steel there will be some additional heating of the work due to magnetic hysteresis losses. This additional heat will tend to be greatest in the areas where the magnetic field is the most concentrated.

The alternating current applied to the coils will generate a magnetic field which is always changing intensity and direction in response to the current. The magnetic core serves to concentrate the magnetic flux generated and deliver it to the center of the area where a weld is desired. The frequency and amplitude of the current applied to the coils may change as the metal heats up and changes characteristics.

Using the structure shown in FIG. 3, in accordance with the method set forth above, it will be seen that the sheets 46 and 48 to be welded, may be welded together without the heavy welding transformer, large cables and electrodes of the past.

Figure 4:
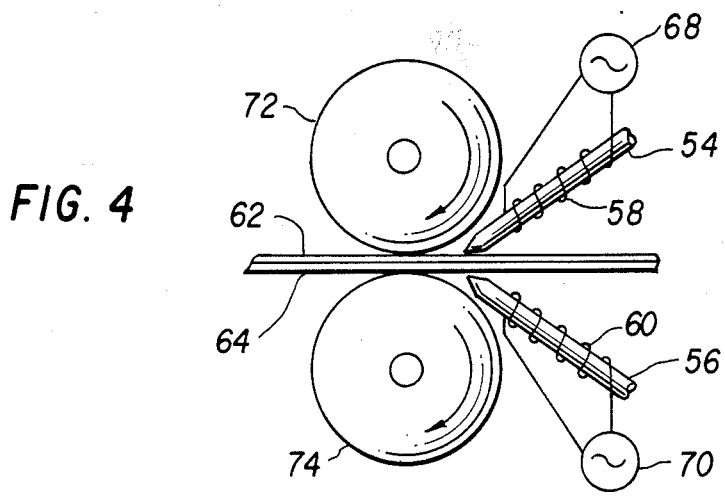
FIG. 4, is a side view of structure for effecting a continuous resistance weld constructed in accordance with the invention and utilizing an inductively coupled power source for effecting continuous welding in accordance with the method of the invention.
Figure 5:
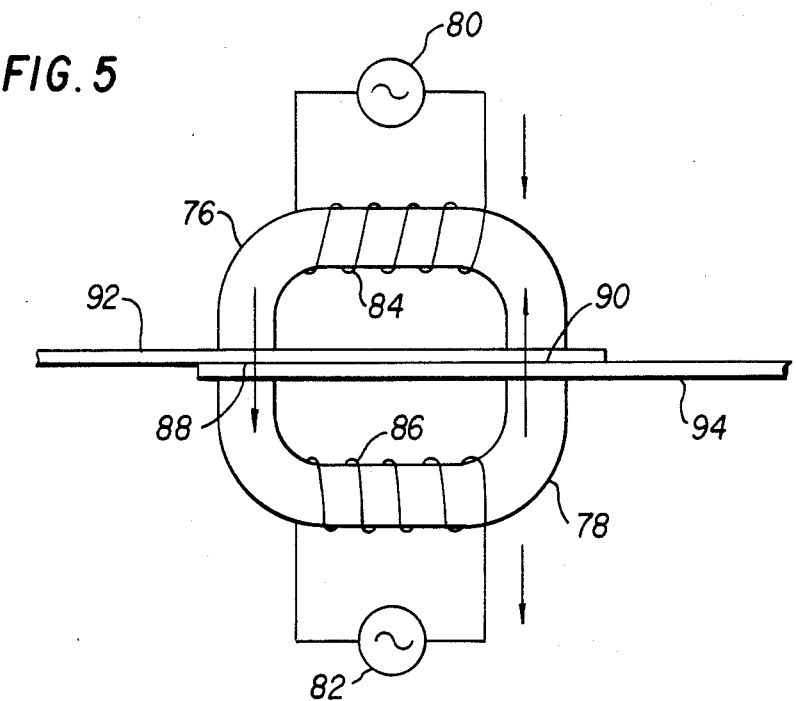
FIG. 5, is a side view of modified resistance welding structure with an inductively coupled power source constructed in accordance with the invention.

In the embodiment of the invention shown in Fig. 4 the linear flux concentrating cores 54 and 56 having the coils 58 and 60 wrapped therearound are tilted towards the direction of movement of the plates 62 and 64 to be welded as shown in FIG. 5 by arrow 66. Also, the coils 58 and 60 are secured to the alternating current power sources 68 and 70 as shown in FIG. 4. Again, the passing of the alternating current through the coils 58 and 60 induces current and magnetic hystersis loss in the plate 62 and 64 and thus heats the plates 62 and 64 as they pass by the flux concentrating coils 54 and 56 in the direction of arrow 66.

In the embodiment of the invention shown in Fig. 4 the forging pressure is then applied to the heated plates 62 and 64 between the pressure wheels 72 and 74 as shown.

The modified structure shown in FIG. 4 for effecting welding in accordance with the method of the invention thus effects a continuous or seam weld.

Further, as shown in FIG. 5, the flux concentrating cores 76 and 78 may be a U-shaped in form so as to concentrate the magnetic flux caused by current from the alternating current power sources 80 and 82 passing through the coils 84 and 86 into separate areas 88 and 90 in the work pieces 92 and 94, whereby two spaced apart simultaneous spot welds may be made in accordance with the method of the invention.

Figure 6:
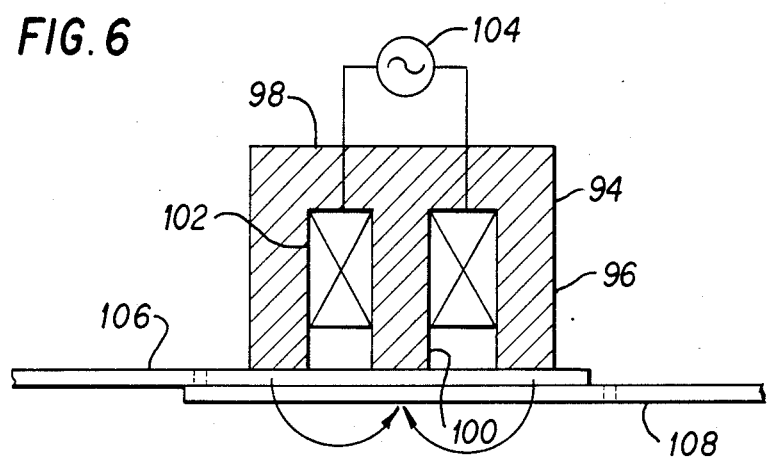
FIG. 6, is a partially broken-away side view of another embodiment of the resistance welding structure of the invention utilizing an inductively coupled power source.

The flux concentrating core 94 as shown in Fig. 6 is generally cup-shaped having an outer hollow cylindrical portion 96, an end wall 98 and a central post 100 about which the coil 102 is wound. The alternating current from the alternating power source 104 thus creates a flux path out of the post 100 connected to the outer cylindrical portion of the flux concentrating core 95 through the metal plates 106 and 108 to again heat the metal plates 106 and 108 in the areas to be spot welded.

The flux concentrating core 94 is particularly advantageous where there is no space available on the opposite side of the metal to be welded. There is of course some drop of efficiency with a flux concentrating core 94 because keeping the magnetic field concentrated and perpendicular to the work is harder to do with a single coil. However, two coils with cup shaped cores 95 on opposite sides of the plates 106 and 108 are more efficient than the simplified linear cores illustrated in FIG. 3.

In accordance with the method of the invention since welding current is being induced rather than conducted into the work in accordance with the structure and method of the invention the surface resistivity of the metal being welding is unimportant. This is of great interest when welding steel which has been treated to resist corrosion because many of the best corrosion resistant coatings are not electrically conductive. Welding of already painted metals is also possible using this method of resistance welding.

While several embodiments and modifications of the present invention have been considered in detail above, it will be understood that other embodiments and modifications are contemplated. It is the intention to include all embodiments and modifications as are defined by the appended claims within the scope of the invention.

I claim:

1. The method of resistance welding comprising heating adjacent members of electrically conductive materials which are in surface to surface contact to their softening temperature with at least one of induced current and hysteresis loss and applying deformation pressure to the heated materials to weld the members together.

2. The method of resistance welding ferromagnetic members together comprising placing the members in surface to surface contact, heating the members to be welded to their softening temperatures by induced current and magnetic hysteresis loss generated by an alternating current in a coil wrapped around a flux concentrating core which concentrates the magnetic field into the area of the weld and applying deformation pressure to the heated ferromagnetic members to weld the members together.

3. The method as set forth in claim 2 wherein the members are heated from both sides.

4. The method as set forth in claim 2 and further including varying the frequency of the alternating electrical signal.

5. The method as set forth in claim 2 wherein the weld produced is a spot weld.

6. The method as set forth in claim 2 wherein the weld produced is a seam weld.

7. Continuous resistance welding structure comprising a coil and a source of alternating electrical energy connected to the coil for heating electrically conductive material positioned adjacent the coil by at least one of an induced current and hysteresis loss in the material, a flux concentrating core operably associated with the coil for concentrating the magnetic flux in the material and further including a second coil and second flux concentrating core positioned adjacent the material on the opposite side of the material from the first coil and first flux concentrating core which coils and flux concentrating cores are positioned at an angle to the material on opposite sides thereof and means for applying pressure to the heated material.

8. Structure as set forth in claim 7 wherein the means for applying pressure to the heated material comprises opposed wheels.

9. Resistance welding structure comprising a coil and a source of alternating electrical energy, connected to the coil for heating members of electrically conductive material positioned together adjacent the coil to their softening temperature by at least one of an induced current and hysteresis loss in the material, a flux concentrating core operably associated with the coil for concentrating the magnetic flux in the material, a second coil and second flux concentrating core on the opposite side of the material from the first coil and concentrating core, and means for applying deformation pressure to the heated material to weld the members together.

10. Structure as set forth in claim 9 wherein the coils and cores on the opposite sides of the material have congruent axis of generation and are substantailly perpendicular to the material.

11. Structure as set forth in claim 9 wherein the means for applying pressure to the heated material is at least one of the coils and cores themselves.

12. Structure as set forth in claim 9 wherein the flux concentrating cores are U-shaped and the ends of the U-shaped flux concentrating cores oppose each other through the material whereby two simultaneous welds may be produced in the material.

13. Resistance welding structure comprising an elongated coil having a longitudinal axis of generation, a source of alternating electrical energy connected to the coil for heating members of electrical conductive material positioned together in surface-to-surface contact adjacent one end of the coil to their softening temperature at the one end of the coil by at least one of an induced current and hysteresis loss in the material, a flux concentrating core extending axially through the coil on the axis of generation of the coil for concentrating magnetic flux in the material, and means for applying deformation pressure to the heated material to weld the members together.

14. Structure as set forth in claim 13 wherein the flux concentrating core is cylindrical and includes an end wall and a central post and wherein the coil is wound around the central post.

15. The method of resistance welding ferromagnetic members together comprising heating the members to be welded to softening temperature by induced current and magnetic hysteresis loss generated by an alternating current in a coil wrapped around a flux concentrating core on both sides of the members which concentrate the magnetic field into the area of the weld and applying deformation pressure to the heated ferromagnetic members to weld the members together.

16. The method as set forth in claim 15 wherein the welding pressure is applied to at least one of the coils and flux concentrating cores.

17. The method as set forth in claim 15 and further including positioning the coils and flux concentrating cores at an angle to the members in mirror image to each other.

18. The method as set forth in claim 17 and further including applying the welding pressure through opposed wheels on opposite sides of the members.

* * * * *